United States Patent

[11] 3,586,029

[72] Inventor James D. Evers
Corry, Pa.
[21] Appl. No. 833,258
[22] Filed June 16, 1969
[45] Patented June 22, 1971
[73] Assignee Aero-Flow Dynamics, Inc.
Corry, Pa.

[54] APPARATUS FOR AUTOMATICALLY CONTROLLING FLUID FLOW ACCORDING TO PREDETERMINED VOLUMETRIC PROPORTIONS
10 Claims, 1 Drawing Fig.

[52] U.S. Cl. ............ 137/100, 137/114, 137/527
[51] Int. Cl. ............ G05d 11/03
[50] Field of Search ............ 137/99, 100, 101, 98, 111, 114

[56] References Cited
UNITED STATES PATENTS
1,581,595 4/1926 Osborne .............. 137/114 X
3,116,748 1/1964 Wasson .............. 137/98
3,154,917 11/1964 Williamson .......... 137/114 X Primary Examiner—Robert G. Nilson
Attorney—Craig, Antonelli, Stewart and Hill ABSTRACT: A device for automatically controlling the volumetric fluid flow from two separate sources according to a predetermined ratio, including two conduits leading from the respective sources and extending in generally convergent paths, a balancing vane device disposed at the juncture of the two conduits such that each side of the vane serves as an extension of the surface of a respective conduit, and a flapper valve body associated with each of the two conduits in the region of the balancing vane device, each of the flapper valve bodies being spring-biased in a direction restricting fluid flow through the associated conduit and thus serving as a nozzle, the balancing vane device being supported for rotation about a central pivot, but being spring-biased to remain in an equilibrium position. Each of the contoured sides of the balancing vane includes a portion adapted to cooperate with a respective flapper valve body in the event of a disproportionate fluid flow tending to cause rotation of the balancing vane to correct the disproportionate flow conditions. Both of the flapper valve bodies and the balancing vane may further include external indicators of the position of each of the respective movable members.

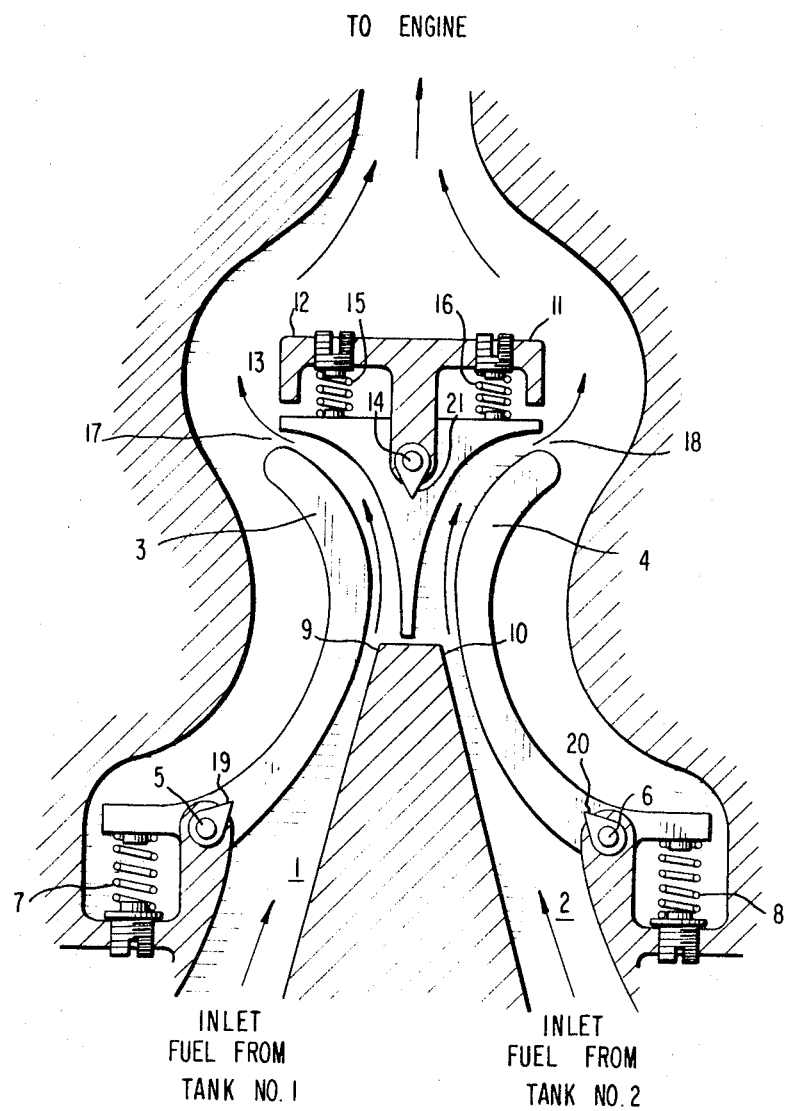

APPARATUS FOR AUTOMATICALLY CONTROLLING FLUID FLOW ACCORDING TO PREDETERMINED VOLUMETRIC PROPORTIONS

BACKGROUND OF THE INVENTION

T8e present invention pertains to an extremely simple though effective construction of a device for equalizing volumetric fluid flow from two diverse sources. A flow equalizer of the type contemplated by the present invention may have wide application in various fields for automatically controlling the mixing of fluid streams. In this connection, it should be apparent that the flow equalizer contemplated by the present invention and described in detail hereinbelow would be equally suitable whether the fluid be a liquid or a gas. In fact, the flow equalizer disclosed herein could well be utilized for controlling the flow of finely divided solids dispersed within a fluid stream.

One specific application for the novel flow equalizer contemplated by the present invention is to function as an equalizing component of an aircraft fuel system, effectively balancing the drainage of fuel from the plural fuel tanks. While other devices have been utilized to accomplish this function heretofore, the devices employed have invariably been more complex in design, thus involving greater manufacturing costs. Further, the devices used heretofore to accomplish the balancing function have generally included a greater number of moving parts, thus involving a greater statistical likelihood of operational failure. Finally, the conventional devices have generally required some form of external energy input to accomplish the desired balancing function.

Thus, it is an object of the present invention to provide a fluid flow equalizer which is both effective and reliable in operation, though simple and inexpensive to manufacture and maintain.

It is another objective of the present invention to provide a proportional fluid flow controller of the type described above which automatically monitors the flow of fluid from the diverse sources and quickly responds to a disproportionate flow condition to correct same without requiring any additional energy input.

Finally, it is an object of the present invention to provide a fluid flow equalizer of the type described above which, by virtue of its simplicity of design and construction, avoids the various disadvantages inherent in the devices in use heretofore for accomplishing a similar function.

SUMMARY OF THE INVENTION

The aforementioned objectives are accomplished, in accordance with the present invention, by providing a balancing vane device having contoured opposite surfaces supported rotatably at the juncture of two convergent conduits carrying fluid from separate sources. Flapper valve bodies are disposed in each of the respective conduits in the region of the balancing vane device and arranged so as to cooperate with a respective opposite surface of the balancing vane device. The flapper valve bodies are each spring-biased toward a closed position, thus serving as a nozzle within each of the respective conduits.

The balancing vane, which is of a substantially T-shaped configuration in plan view, is supported pivotably about a point upon its axis of symmetry, located near the junction of the stem and crossbar portions of the T-shaped member. The stem portion extends between the two respective conduits and the opposite sides thereof have a curved configuration which serve as extensions of the respective conduits. The balancing vane is spring-biased to remain in a neutral position.

Assuming that the spring load on each of the flapper valve bodies is substantially identical, a substantially equal fluid pressure in excess of the force exerted by the spring load in each of the two respective conduits will allow the balancing vane to remain in its neutral position and permit the passage of a substantially balanced flow of fluid from the two respective conduits. If, however, for any reason, the fluid pressure in one of the two conduits decreases substantially relative to the fluid pressure in the other conduit, the unbalanced flow from one conduit will exert a force upon the balancing vane which will create a moment about its pivotal support, causing the balancing vane to be rotated against its spring bias. Thus rotated, the crossbar portion of the T-shaped member, cooperating with the flapper valve body disposed within the conduit wherein the relatively greater flow exists, serves to restrict the passage of fluid thereby. At the same time, the thus rotated balancing vane provides a correspondingly increased passage for the fluid in the conduit wherein the relatively lesser flow exists. As a result, the flow of fluid within the two conduits will shortly be returned to substantial equilibrium at which time the balancing vane will automatically return to its equilibrium, or neutral position.

External indicators may additionally be provided to afford a simple visual means for determining the position of each of the flapper valve bodies as well as the balancing vane. These indicators serve to quickly apprise the service personnel of the location of the source of any unbalanced flow conditions.

BRIEF DESCRIPTION OF THE DRAWING

The aforementioned objectives, features, and advantages of the present invention will become more readily apparent from a consideration of the detailed description hereinbelow, when considered in conjunction with the accompanying drawing which is a schematic representation of a plan view of the fluid flow equalizer constructed in accordance with the present invention.

DETAILED DESCRIPTION OF THE DRAWING

The schematic representation illustrates one embodiment of the fluid flow equalizer constructed in accordance with the present invention, as intended to serve for balancing fuel flow from two separate tanks to an engine. In the drawing, reference numerals 1 and 2 designate, respectively, two convergent conduits carrying fuel from fuel tanks numbers 1 and 2 (not shown), the direction of flow within the conduits 1 and 2 being indicated by the arrows in the respective conduits. Contoured flapper valve bodies 3 and 4, pivotally supported at pins 5 and 6, respectively, are associated with conduits 1 and 2, respectively. Each of the flapper valve bodies 3 and 4 are spring-biased, by means of coil springs 7 and 8, respectively, to offer resistance, of a predetermined magnitude, to fuel flow through the respective associated conduit. Thus, the flapper valve bodies 3 and 4 serve as check valves which will open only when the pressure of the fuel in the respective conduit exceeds a predetermined minimum level, for example, about two psi.

Once the fuel pressure in each of the conduits 1 and 2 exceeds that pressure which will exert a force exceeding the predetermined minimum magnitude, the flapper valve bodies 3 and 4 rotate about their respective pivots 5 and 6 and assume a position, such as that illustrated, wherein they are balanced by the fuel pressure and the forces of springs and 8, respectively. In the illustrated position, the valve bodies 3 and 4, cooperating with the opposing surfaces 9 and 10 at the ends of conduits 1 and 2, respectively, exert a nozzlelike influence on the fuel flowing in the conduits.

The balancing vane device, generally designated by reference numeral 11, includes a relatively stationary support member 12 disposed a short distance downstream of the point of convergence of the two conduits 1 and 2. A balancing vane 13, having a substantially T-shaped configuration, is pivotably supported about pin 14. T8e stem portion of the T-shaped balancing vane extends between conduits 1 and 2 and has contoured opposite surfaces each of which cooperates with a respective one of valve bodies 3 and 4 to form extensions of conduits 1 and 2.

T8e balancing vane 13 is spring-biased on opposite sides of pivot pin 14 means of coil springs 15 and 16 which, by the exertion of equal and opposite moments, tend to retain balancing vane 13 in its equilibrium, or neutral, position illustrated. In this position, the fuel flow from each of conduits 1 and 2 is throttled, at points 17 and 18, respectively, between the opposite surfaces of balancing vane 13 and valve bodies 3 and 4, respectively.

If, however, the fuel pressure in either of the conduits should differ from that in the other conduit. Which condition might result from a malfunction of a fuel pump or an obstruction of one of the conduits, for example, then the relatively greater fuel pressure prevailing in the other conduit will tend to exert an unbalanced force against its side of the balancing vane 13 at a point upstream of the pivot 14, thereby creating a bending moment causing vane 13 to be rotated from its neutral position and to cooperate with the respective valve body to restrict the flow of fuel from that conduit wherein the relatively greater pressure prevails until such time as the cause of the unbalanced flow can be corrected. Thus, even though the fuel pressure in the two conduits is unbalanced, the flow quantity of fuel passing from the throttling points 17 and 18 remains substantially in balance.

Externally positioned indicators 19 and 20 are provided for purposes of quickly indicating the position of valve bodies 3 and 4, respectivly. Similarly, an external indicator 21 is provided to afford a visual indication of the position of balancing vane 13.

Of course, the fluid flow equalizer contemplated by the present invention may also be employed so as to maintain a predetermined unbalanced flow condition. This could be accomplished very simply by either manually or automatically adjusting the spring-load on the balancing vane 13 to the desired unbalanced proportions. While the present invention has been described hereinabove with reference to but a single embodiment, it is to be clearly understood that the scope of the invention is not limited to the specific details of the single embodiment, but is susceptible of numerous changes and modifications as would be apparent to one with normal skill in the pertinent technology.

What I claim is:

1. Apparatus for automatically controlling fluid flow from two separate sources according to predetermined volumetric proportions, comprising:
   two conduit means for conveying fluid, under pressure, from said two separate sources, respectively, said two conduit means converging at their respective outlet ends,
   check valve means disposed in each of said two conduit means in the region of said outlet ends thereof, said check valve means being spring-biased toward a position whereby each of said conduit means is effectively closed, and
   balancing vane means disposed between the respective outlet ends of said two conduit means approximately at the point of convergence thereof for responding to a sensed volumetric flow deviating from said predetermined proportions to restrict the fluid flow from either of said two conduit means to restore the proportional fluid flow from said two conduit means to the predetermined ratio.

2. Apparatus according to claim 1, wherein said check valve means include flapper valve body means pivotably supported at one side of each of said two conduit means.

3. Apparatus according to claim 2, wherein said balancing vane means includes a balancing vane having a substantially T-shaped configuration in plan view, the stem portion of said T-shaped member extending between the respective outlet ends of said two conduit means.

4. Apparatus according to claim 3, wherein said balancing vane means further includes relatively stationary support means, said balancing vane being pivotably supported at said support means for rotation relative thereto.

5. Apparatus according to claim 4, wherein the two opposite sides of said balancing vane are spaced from one of said two flapper valve body means and contoured so as to define, together with each of said respective valve body means, extensions, of variable cross-sectional area, of each of said two conduit means.

6. Apparatus according to claim 5, wherein a stem portion of said balancing vane means extends upstream therefrom such that the fluid flow from each of said conduit means exerts a force thereon producing a moment about the pivotal support of said balancing vane means.

7. Apparatus according to claim 6, wherein said balancing vane is spring-biased at two places on opposite sides of its pivotal support to cause said vane to assume an equilibrium position.

8. Apparatus according to claim 7, wherein said balancing vane is spring-biased such that the moments produced by the loading thereon are equal and opposite and the equilibrium position of the vane approximately bisects the angle between the two convergent conduit means, wherein the cross-sectional area of said two conduit means is substantially equal, and wherein the spring-bias on each of said check valve means is substantially equal, whereby the volumetric fluid flow from the two conduit means is effectively equalized.

9. Apparatus according to claim 8, further comprising means for indicating the positions of each of said check valve means and said balancing vane.

10. Apparatus according to claim 8, wherein said means for indicating the positions of said check valve means and said balancing vane include pointers provided at the respective pivotal supports of each of the three movable members and secured for rotation with the respective associated movable member.